US009952580B2

(12) United States Patent
Bode et al.

(10) Patent No.: US 9,952,580 B2
(45) Date of Patent: Apr. 24, 2018

(54) METHOD AND AN APPARATUS FOR MACHINING A PART FOR AN ASSEMBLY

(71) Applicant: The Boeing Company, Chicago, IL (US)

(72) Inventors: Aksel Bode, Bellevue, WA (US); Bela Laszlo Zold, Stanwood, WA (US); Peter H. Bui, Lynnwood, WA (US); David James Odendahl, Kirkland, WA (US); Frederick James Richter, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 240 days.

(21) Appl. No.: 15/010,081

(22) Filed: Jan. 29, 2016

(65) Prior Publication Data

US 2017/0220021 A1  Aug. 3, 2017

(51) Int. Cl.
*G05B 19/19* (2006.01)
*B23Q 35/02* (2006.01)
*B64F 5/10* (2017.01)

(52) U.S. Cl.
CPC ............ *G05B 19/19* (2013.01); *B23Q 35/02* (2013.01); *B64F 5/10* (2017.01); *G05B 2219/36201* (2013.01); *G05B 2219/37199* (2013.01); *G05B 2219/37593* (2013.01); *G05B 2219/50002* (2013.01)

(58) Field of Classification Search
CPC .......... G05B 19/19; G05B 2219/50002; G05B 2219/37593; G05B 2219/36201; G05B 2219/37199; B64F 5/10; B23Q 35/02
See application file for complete search history.

(56) References Cited

U.S. PATENT DOCUMENTS

| | | | | |
|---|---|---|---|---|
| 4,998,206 A | * | 3/1991 | Jones ................. | G05B 19/4097 700/145 |
| 5,812,402 A | * | 9/1998 | Nishiyama ......... | G05B 19/4099 425/130 |
| 5,903,459 A | * | 5/1999 | Greenwood ......... | G05B 19/401 700/108 |
| 5,910,894 A | * | 6/1999 | Pryor ............... | G05B 19/41875 219/121.64 |

(Continued)

OTHER PUBLICATIONS

Extended European Search Report, dated Jul. 3, 2017, regarding Application No. 17153459.7, 7 pages.

*Primary Examiner* — Ramesh Patel
(74) *Attorney, Agent, or Firm* — Yee & Associates, P.C.

(57) ABSTRACT

A method and apparatus for machining a part for an assembly. First sensor data is acquired for a surface of a first part from a first sensor system. Second sensor data is acquired for a set of existing holes in a second part from a second sensor system. A surface model of the surface of the first part is generated using the first sensor data. First offset data is computed based on a nominal model of a third part that is nominally positioned relative to the surface model within a three-dimensional virtual environment. Second offset data is computed for the set of existing holes using the second sensor data. Overall offset data is generated using the first and second offset data, wherein the overall offset data is used to drill a set of holes in the third part for use in fastening the third part to the second part.

20 Claims, 11 Drawing Sheets

(56) References Cited

U.S. PATENT DOCUMENTS

| | | | |
|---|---|---|---|
| 6,542,937 B1 * | 4/2003 | Kask | G05B 19/4097 |
| | | | 700/182 |
| 6,681,145 B1 * | 1/2004 | Greenwood | B25J 9/1692 |
| | | | 700/176 |
| 8,655,480 B1 | 2/2014 | Odendahl et al. | |
| 8,661,684 B1 * | 3/2014 | Boyd | B21D 53/92 |
| | | | 29/407.1 |
| 2010/0010660 A1 * | 1/2010 | Salour | G05B 19/402 |
| | | | 700/117 |
| 2014/0236334 A1 * | 8/2014 | Glasscock | G05B 19/4097 |
| | | | 700/97 |
| 2015/0314436 A1 * | 11/2015 | Reid | B25J 11/005 |
| | | | 414/800 |

* cited by examiner

METHOD AND AN APPARATUS FOR MACHINING A PART FOR AN ASSEMBLY

BACKGROUND INFORMATION

1. Field

The present disclosure relates generally to determining locations for holes that are to be drilled in parts. More particularly, the present disclosure relates to a computer-implemented method and apparatus for predetermining the locations for holes that are to be drilled in at least one part of an assembly.

2. Background

Many different parts may be used to build an assembly. In particular, different parts may be fastened together to build an assembly. For example, without limitation, building an assembly may include installing fasteners in holes that pass through two or more parts at various locations. Drilling these holes in parts prior to the assembly process may improve the efficiency of the assembly process. However, some currently available processes for drilling holes in parts may be more time-consuming and tedious than desired. Further, the accuracy and consistency of the locations of the holes that are drilled using these processes may be less than desired.

Pre-drilling holes in parts at nominal locations selected for these holes based on nominal configurations for parts may lead to inaccurate locations for holes. As one specific example, a first machined part and a second machine part that already have holes may be fastened together using a third machined part to form an assembly. A computer model of the assembly may define a nominal surface shape for a first part and a nominal surface shape for a second part. However, the actual surface shape that results when the first part is machined may vary from the nominal surface shape. Similarly, the actual surface shape that results when the second part is machined may vary from the nominal surface shape.

Further, the computer model of the assembly may also define nominal locations for holes in the first part and nominal locations for holes in the second part. However, the actual locations of the holes that are drilled into the first part, the actual locations of the holes that are drilled into the second part, or both, may vary from the nominal locations for these holes.

The computer model of the assembly may also define nominal locations for holes to be drilled in the third part. However, drilling holes into the third part based on these nominal locations without taking into account the variances in the first part and the second part, as described above, may lead to inaccurate hole locations for holes on the third part.

These inaccuracies may affect the process of assembling the first part, the second part, and the third part. In particular, assembly of the three parts may be more difficult and time-consuming than desired. In some cases, assembly of these three parts may be impossible without performing more rework and shimming than is desired. Therefore, it would be desirable to have a method and apparatus that take into account at least some of the issues discussed above, as well as other possible issues.

SUMMARY

In one illustrative embodiment, a method is provided for machining a part for an assembly. First sensor data is acquired for a surface of a first part from a first sensor system. Second sensor data is acquired for a set of existing holes in a second part from a second sensor system. A surface model of the surface of the first part is generated using the first sensor data. First offset data is computed based on a nominal model of a third part that is nominally positioned relative to the surface model within a three-dimensional virtual environment. Second offset data is computed for the set of existing holes using the second sensor data. Overall offset data is generated using the first offset data and the second offset data, wherein the overall offset data is used to drill a set of holes in the third part for use in fastening the third part to the second part.

In another illustrative embodiment, a method is provided for assembling a fitting, a stringer, and a structure associated with a body of an aircraft. A surface of the stringer is imaged using a first laser imaging system to generate first point cloud data. A set of existing holes in the structure is imaged using a second laser imaging system to generate second point cloud data. A surface model of the surface of the stringer is generated using the first point cloud data. First offset data is computed based on a nominal model of the fitting that is nominally positioned relative to the surface model within a three-dimensional virtual environment. Second offset data is computed for the set of existing holes in the structure associated with the body. Overall offset data is generated using the first offset data and the second offset data. A set of holes is drilled in the fitting based on the overall offset data.

In yet another illustrative embodiment, an apparatus for machining a structure for an assembly comprises a part modeler and an offset data generator. The part modeler is implemented in a computer system that is in communication with a first sensor system and a second sensor system. The part modeler acquires first sensor data for a surface of a first part from the first sensor system and second sensor data for a set of existing holes in a second part from the second sensor system. The part modeler generates a surface model of the surface of the first part using the first sensor data. The offset data generator is implemented in the computer system, wherein the offset data generator computes first offset data based on a nominal model of a third part that is nominally positioned relative to the surface model of the surface of the first part within a three-dimensional virtual environment. The offset data generator computes second offset data for the set of existing holes in the second part. The offset data generator generates overall offset data using the first offset data and the second offset data, wherein the overall offset data is used to drill a set of holes in the third part for use in fastening the third part to the second part.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
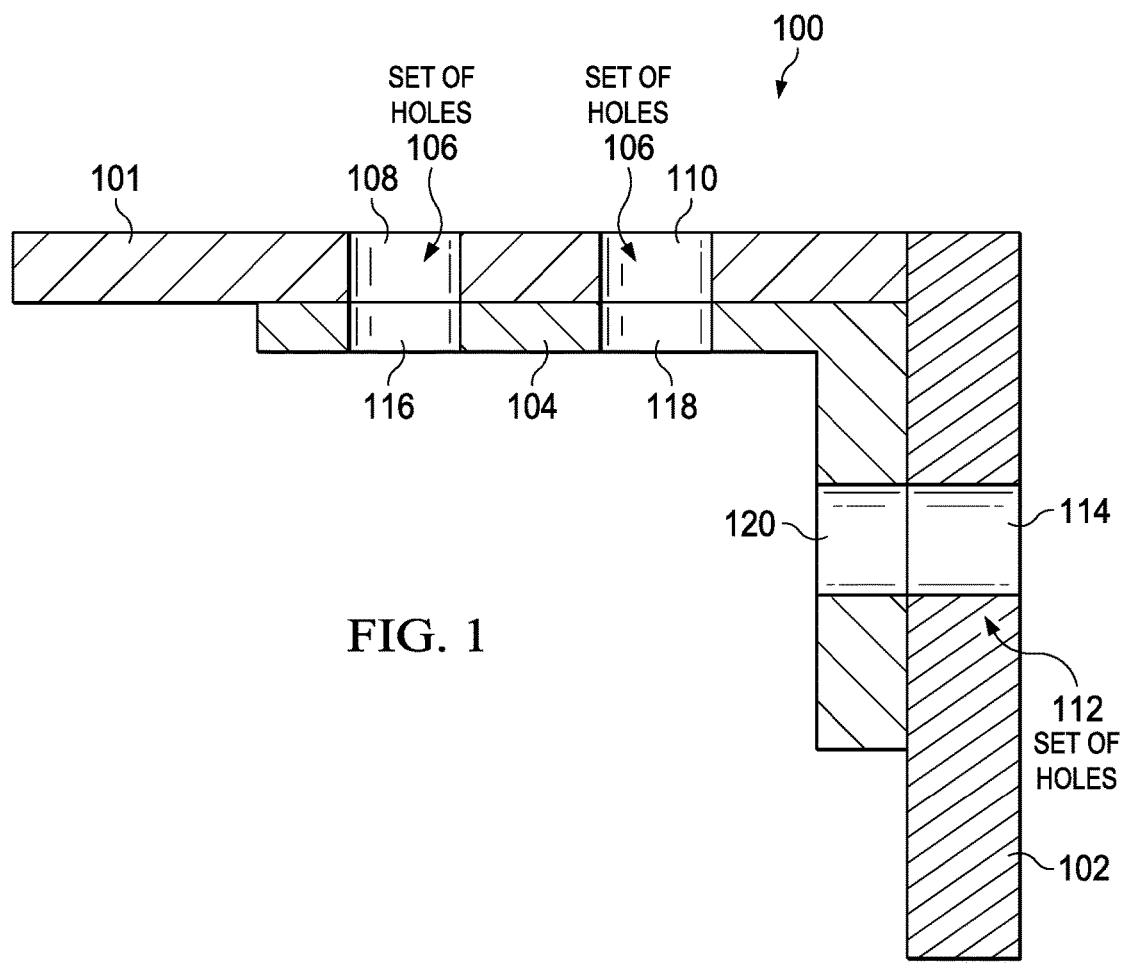
FIG. 1 is an illustration of a side view of an assembly in accordance with an illustrative embodiment.

The illustrative embodiments recognize and take into account different considerations. The illustrative embodiments recognize and take into account that the efficiency of assembling machined parts may be improved by correcting nominal locations for holes that have yet to be drilled into a particular part based on the actual surface shape of other parts that have already been machined and the actual locations of holes that have already been drilled in these other parts.

As one illustrative example, a stringer may be fastened to a structure associated with the body of an aircraft using a fitting. When fastening the stringer to the structure, it may be desirable to drill holes in the fitting at locations that are based on the actual machined configuration of the stringer and the actual machined configuration of the structure rather than nominal locations for these holes. More specifically, it may be desirable to adjust the nominal locations for the holes to be drilled in the fitting based on variances in the surface shape of the stringer and variances in the locations of existing holes in the structure.

In one illustrative embodiment, a method is provided for identifying locations for holes to be drilled in a part for an assembly. First sensor data for an actual machined configuration of a first part is acquired from a first sensor system. In some cases, this first sensor data may be for a surface of the first part. Second sensor data for an actual machined configuration of a second part is acquired from a second sensor system. In some cases, this second sensor data may be for a set of existing holes in the second part. As used herein, the phrase "set of" when used with some type of item means one or more of that item. In this manner, a set of existing holes may include one or more existing holes.

First offset data is then computed using the first sensor data and a nominal model of a third part. For example, without limitation, a surface model of the surface of the first part may be generated using the first sensor data. The first offset data may be computed based on the nominal model of the third part being nominally positioned relative to the surface model within a three-dimensional virtual environment. Further, second offset data is then computed using the second sensor data. For example, without limitation, the second offset data may be computed for the set of existing holes.

Overall offset data may then be generated using the first offset data and the second offset data. The overall offset data may be used to identify a location for each hole that is to be drilled in the third part. For example, the overall offset data may be used to adjust a set of nominal locations for a set of holes to be drilled in the third part to form a set of new nominal locations for the holes. The set of holes may then be drilled into the third part at the set of new nominal locations for use in fastening the third part to at least one of the first part or the second part. At least one of the first part or the second part may include the first part, the second part, or both.

In another illustrative embodiment, a method is provided for assembling a fitting, a stringer, and a structure associated with a body of an aircraft. A surface of the stringer is imaged using a first laser imaging system to generate first point cloud data. A set of existing holes in the structure is imaged using a second laser imaging system to generate second point cloud data. A surface model of the surface of the stringer is generated using the first point cloud data. First offset data is computed based on a nominal model of the fitting that is nominally positioned relative to the surface model within a three-dimensional virtual environment. Second offset data is computed for the set of existing holes in the structure associated with the body. Overall offset data is generated using the first offset data and the second offset data. A set of holes is drilled in the fitting based on the overall offset data.

With reference now to FIG. 1, an illustration of a side view of an assembly is depicted in accordance with an illustrative embodiment. In this illustrative example, assembly 100 includes first part 101, second part 102, and third part 104. First part 101 has first set of holes 106. First set of holes 106 includes hole 108 and hole 110. Second part 102 has second set of holes 112. Second set of holes 112 includes at least hole 114.

Third part 104 has first hole 116, second hole 118, and third hole 120 that have been drilled into third part 104 at locations that are based on the actual machined configurations of first part 101 and second part 102 as compared to nominal locations for these three holes. In one illustrative example, first hole 116, second hole 118, and third hole 120 may have been drilled into third part 104 at locations that are aligned with or adjusted to align with the actual machined configurations of first part 101 and second part 102. A computer system configured for the special purpose of predicting the locations for the types of holes that are drilled in third part 104 is described in FIG. 2.

Figure 2:
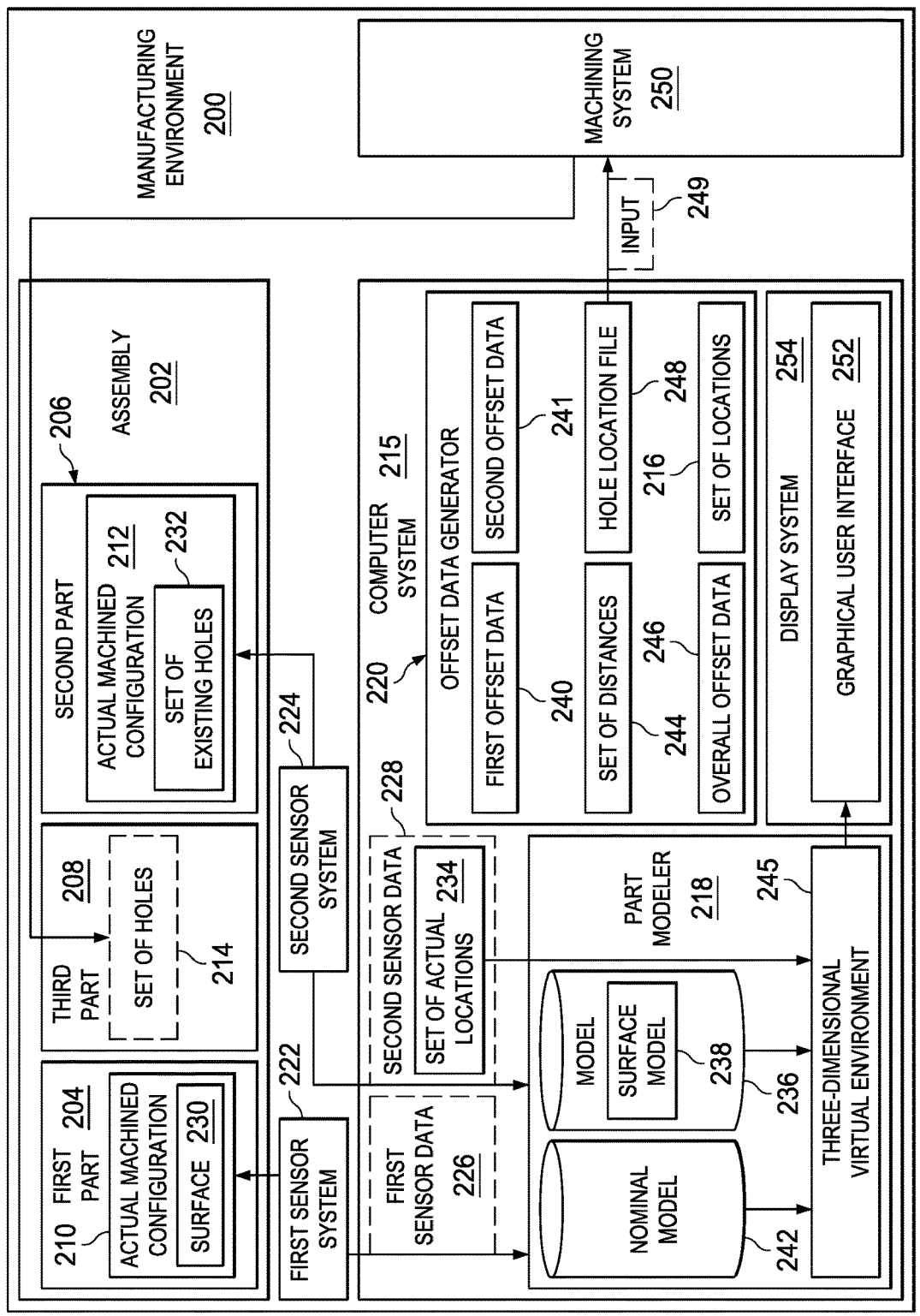
FIG. 2 is an illustration of a block diagram of a manufacturing environment in accordance with an illustrative embodiment.

With reference now to FIG. 2, an illustration of a block diagram of a manufacturing environment is depicted in accordance with an illustrative embodiment. In this illustrative example, manufacturing environment 200 is an environment in which assembly 202 may be built. Assembly 202 includes first part 204, second part 206, and third part 208. Assembly 100, first part 101, second part 102, and third part 104 in FIG. 1 may be examples of implementations for first part 204, second part 206, and third part 208, respectively, in FIG. 2.

In one illustrative example, first part 204, second part 206, and third part 208 may be machined in manufacturing environment 200. In another illustrative example, first part 204, second part 206, third part 208, or a combination thereof, may be machined in a different manufacturing environment prior to being brought into manufacturing environment 200 for use in building assembly 202. Manufacturing environment 200 may take the form of a factory, a manufacturing facility, a hangar, or some other type of environment for the manufacturing of parts and assemblies.

Building assembly 202 may include fastening first part 204, second part 206, and third part 208 together. First part 204 may have actual machined configuration 210. Second part 206 may have actual machined configuration 212. As used herein, an "actual machined configuration" for a part, such as first part 204 or second part 206, may include a surface of the part, an overall shape of the part, the locations of existing holes in the part, or a combination thereof. The surface of the part may include an exterior surface of the part, an interior surface of the part, or both. Further, the surface of the part may be continuous or discontinuous.

In this illustrative example, fastening first part 204, second part 206, and third part 208 together includes drilling set of holes 214 into third part 208 and installing fasteners through set of holes 214 to attach third part 208 to at least one of first part 204 or second part 206. At least one of first part 204 or second part 206 may include first part 204, second part 206, or both.

Computer system 215 may be used to identify set of locations 216 for drilling set of holes 214 into third part 208. Each location in set of locations 216 may be a three-dimensional coordinate in a coordinate frame for assembly 202 or third part 208. Computer system 215 may be comprised of one computer or multiple computers that are in communication with each other. In one illustrative example, computer system 215 is configured as a special-purpose computer system for use in identifying locations for holes to be drilled into parts that are to be attached to other parts. For example, computer system 215 may be a special-purpose computer for use in identifying locations for holes to be drilled into parts, such as third part 208.

Part modeler 218 and offset data generator 220 are implemented within computer system 215. Each of part modeler 218 and offset data generator 220 may take the form of a module that is implemented within computer system 215. In this illustrative example, a module may be implemented in software, hardware, firmware, or a combination thereof. When software is used, the operations performed by the module may be implemented using, for example, without limitation, program code configured to run on a processor unit. When firmware is used, the operations performed by the module may be implemented using, for example, without limitation, program code and data and stored in persistent memory to run on a processor unit.

When hardware is employed, the hardware may include one or more circuits that operate to perform the operations performed by the module. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

As depicted, part modeler 218 is in communication with first sensor system 222 and second sensor system 224. In one illustrative example, first sensor system 222 and second sensor system 224 may be different sensor systems, each including one or more sensor devices. For example, without limitation, first senor system 222 and second sensor system 224 may each refer to a different laser imaging system. In another illustrative example, first sensor system 222 and second sensor system 224 may take the form of a single sensor system. For example, without limitation, first senor system 222 and second sensor system 224 may refer to the same laser imaging system.

Part modeler 218 acquires first sensor data 226 for actual machined configuration 210 of first part 204 from first sensor system 222. Part modeler 218 acquires second sensor data 228 for actual machined configuration 212 of second part 206 from second sensor system 224.

In one illustrative example, first sensor data 226 for actual machined configuration 210 of first part 204 comprises imaging data of surface 230 of first part 204. In other words, first sensor data 226 may capture the shape of surface 230 of first part 204. As one illustrative example, first sensor data 226 may take the form of point cloud data that captures the shape of surface 230 of first part 204.

In one illustrative example, second sensor data 228 for actual machine configuration 212 of second part 206 comprises imaging data of set of existing holes 232 in second part 206. In some cases, second sensor data 228 includes set of actual locations 234 for set of existing holes 232 in second part 206. In one illustrative example, each actual location in set of actual locations 234 may be substantially centered with respect to a corresponding hole in set of existing holes 232.

In some cases, set of holes 214 to be drilled in third part 208 may be equal in number to set of existing holes 232 such that set of holes 214 in third part 208 are to be drilled to match up with set of existing holes 232 in second part 206. In other illustrative examples, set of holes 214 may be greater in number than set of existing holes 232 such that only a portion of set of holes 214 are meant to match up with set of existing holes 232. In these other illustrative examples, another portion of set of holes 214 may be meant to match up with one or more holes that have been drilled into first part 204.

Part modeler 218 generates model 236 of first part 204 using first sensor data 226. Model 236 is a computer-based, three-dimensional model of first part 204. When first sensor data 226 captures the shape of surface 230 of first part 204, model 236 takes the form of surface model 238. Surface model is a computer-based, three-dimensional model of surface 230 of first part 204.

Offset data generator 220 computes first offset data 240 based on nominal model 242 of third part 208 being nominally positioned relative to model 236 of first part 204 within three-dimensional virtual environment 245. First offset data 240 is computed by measuring set of distances 244. Set of distances 244 includes a distance for each portion of surface model 238 of first part 204 that is supposed to interface with nominal model 242 of third part 208. Here, each interfacing portion of surface model 238 may represent, for example, without limitation, a side of first part 204 that is supposed to contact a corresponding side of third part 208.

Each distance in set of distances 244 is a measurement of the distance between an actual location and a nominal location of a most protruding point on a corresponding portion of surface model 238 of first part 204 that interfaces with nominal model 242 of third part 208 in three-dimensional virtual environment 245. The most protruding point is the most protruding point with respect to a two-dimensional plane through nominal model 242 of third part 208.

The actual location of the most protruding point is defined by surface model 238 where surface model 238 would first make contact with nominal model 242 of third part 208. The nominal location of the most protruding point may be defined based on nominal model 242 of third part 208 being nominally positioned relative to surface model 238.

Thus, in this manner, offset data generator 220 identifies an actual location of the most protruding point on each portion of surface model 238 of first part 204 that interfaces with nominal model 242 of third part 208. Offset data generator 220 computes a distance between the actual location and a nominal location of each protruding point identified.

Set of distances 244 is used to generate a first x-axis offset and a first y-axis offset for each hole of set of holes 214 that is to be drilled into third part 208. The resulting set of first x-axis offsets and first y-axis offsets forms first offset data 240. In some cases, offset data generator 220 applies a selected factor to each distance in set of distances 244 based on a geometry of nominal model 242 to generate the first x-axis offset and the first y-axis offset for each hole of set of holes 214 that is to be drilled into third part 208.

The geometry of nominal model 242 may include the angles and overall shape of nominal model 242 of third part 208. The selected factor may be, for example, a factor of 2, a factor of 1.5, a factor of 3, a factor of 2.25, or some other type of factor. Multiplying the selected factor by each distance in set of distances 244 increases each distance in set of distances 244 to take into account the angles and overall shape of nominal model 242, and thereby third part 208. In other words, applying the selected factor accounts for any variances in the angles and overall shape of nominal model 242 to ensure that when third part 208 is actually positioned relative to first part 204 during the joining process, sufficient spacing will be present around third part 208 to ensure that undesired effects do not occur to either third part 208 or first part 204 due to unexpected contact or forceful contact.

In this illustrative example, first offset data 240 includes offsets only for an x-axis and a y-axis of three-dimensional virtual environment 245. The position of third part 208 relative to first part 204 may be considered fixed with respect to a z-axis. Thus, the position of nominal model 242 relative to surface model 238 may also be considered fixed with respect to the z-axis.

Offset data generator 220 computes second offset data 241 for set of existing holes 232 in second part 206 using second sensor data 228. In one illustrative example, second offset data 241 is computed by measuring a difference between a nominal location and an actual location for each existing hole in set of existing holes 232 in second part 206. The difference between the nominal location and the actual location for each existing hole is used to compute a second x-axis offset and a second y-axis offset for each hole in set of holes 214 that is to be drilled into third part 208.

In this illustrative example, second offset data 242 includes offsets only for the x-axis and y-axis of three-dimensional virtual environment 245. The position of third part 208 relative to second part 206 may be considered fixed with respect to the z-axis. Thus, the position of nominal model 242 relative to set of actual locations 234 for set of existing holes 232 in second part 206 may also be considered fixed with respect to the z-axis.

In these illustrative examples, offset data generator 220 generates overall offset data 246 using first offset data 240 and second offset data 241. Overall offset data 246 may include, for example, without limitation, an overall x-axis offset and an overall y-axis offset for each hole in set of holes 214 that is to be drilled into third part 208. The overall x-axis offset and the overall y-axis offset generated for each hole in set of holes 214 that is to be drilled into third part 208 is used to adjust a nominal location previously identified for that hole to thereby form a new location for that hole. The new location identified for each hole in set of holes 214 forms set of locations 216 for drilling set of holes 214 in third part 208. Each location in set of locations 216 may be a three-dimensional coordinate with respect to a coordinate frame for assembly 202 or third part 208, or in some cases, three-dimensional virtual environment 245.

Offset data generator 220 uses overall offset data 246 to generate hole location file 248 for a machining process to be performed by machining system 250. Machining system 250 may include a computer numerical control device that includes, or is in communication with, a drilling tool, a milling tool, or some other type of machining tool capable of forming holes.

Hole location file 248 identifies set of locations 216 on third part 208 at which set of holes 214 is to be drilled. In one illustrative example, machining system 250 may include, for example, without limitation, a computer numerical control device that is capable of receiving the hole location file. The computer numerical control device may be controlled using the hole location file to controllably position a drill or machining tool at the adjusted set of locations 216 for set of holes 214 to drill set of holes 214 into third part 208 at set of locations 216.

In another illustrative example, hole location file 248 may be used to generate input 249 for the computer numerical control device in machining system 250. For example, without limitation, hole location file 248 may be in an XML format that may be converted into an input 249 for the computer numerical control device. The computer numerical control device may be controlled using input 249 to generate a CNC program for the computer numerical control device to controllably position a drill or machining tool at the adjusted hole locations to drill set of holes 214 in third part 208 at set of locations 216. Accordingly, computer system 215, part modeler 218, offset data generator 220, or a combination thereof may be configured to output a hole location file such as an XML file to generate a program for causing the computer numerical control device to controllably position a drill or machining tool at the adjusted hole locations to drill set of holes 214 in third part 208 at set of locations 216. The program generated may take the form of, for example, without limitation, a file in a Drawing eXchange Format (DXF), an Initial Graphics Exchange Specification (IGES) format, a computer-aided manufacturing (CAM) format, or some other format.

Once set of holes 214 have been drilled into third part 208, first part 204, second part 206, and third part 208 may be joined together to form assembly 202. In one illustrative example, assembly 202 may be for an aircraft. In this example, first part 204 may take the form of a stringer, second part 206 may take the form of a structure associated with a body of the aircraft, and third part 208 may take the form of a fitting. In one illustrative example, second part 206 takes the form of a T-chord structure associated with the body of the aircraft.

As used herein, when one component is "associated" with another component, the association is a physical association in the depicted examples. For example, a first component, such as a structure, may be considered to be associated with a second component, such as a body of an aircraft, by being at least one of secured to the second component, bonded to the second component, mounted to the second component, welded to the second component, fastened to the second component, or connected to the second component in some other suitable manner. The first component also may be connected to the second component using a third component. Further, the first component may be considered to be associated with the second component by being formed as part of the second component, as an extension of the second component, or both. In some cases, the first component may be considered part of the second component.

Thus, part modeler 218 and offset data generator 220 enable predetermining set of locations 216 for set of holes 214 for third part 208 that meet a desired level of accuracy and consistency based on the actual machined configurations of first part 204 and second part 206. Further, the method and apparatus described above enable set of locations 216 to be more quickly and accurately identified so as to improve the efficiency of the overall process of building assembly 202.

The illustration of manufacturing environment 200 in FIG. 2 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some cases, assembly 202 may be built using any number of first parts similar to first part 204, any number of second parts similar to second part 206, and any number of third parts similar to third part 208. In other illustrative examples, part modeler 218 and offset data generator 220 may be implemented as a single module that is implemented within computer system 215.

In some illustrative examples, part modeler 218, offset data generator 220, or both, may be capable of displaying three-dimensional virtual environment 245 in graphical user interface 252 on display system 254 to a user. The user may be allowed to manipulate surface model 238, nominal model 242, or both, depending on the implementation. In some illustrative examples, the user may be allowed to make manual adjustments to first offset data 240, second offset data 241, overall offset data 246, or a combination thereof, to ensure that set of locations 216 identified for set of holes 214 satisfactorily meet a set of requirements for set of holes 214.

Although first offset data 240 and second offset data 241 are described as only including offsets for the x-axis and y-axis in these examples, other offsets may be included in other illustrative examples. In some cases, first offset data 240 and second offset data 242 may include offsets for the x-axis and z-axis of three-dimensional virtual environment 245. The position of third part 208 relative to first part 204 and second part 206 may be considered fixed with respect to the y-axis.

Figure 3:
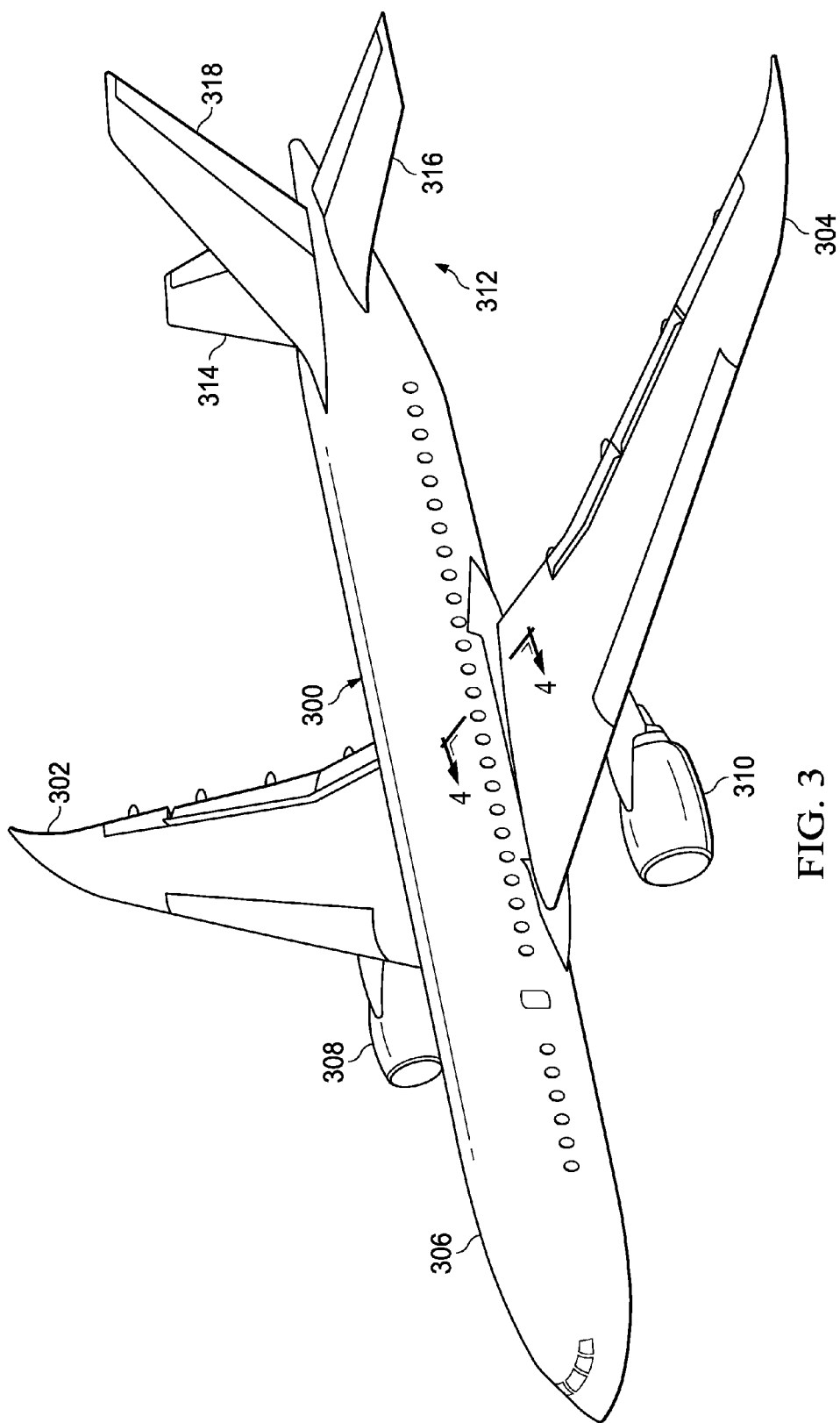
FIG. 3 is an illustration of an isometric view of an aircraft in accordance with an illustrative embodiment.

With reference now to FIG. 3, an illustration of an isometric view of an aircraft is depicted in accordance with an illustrative embodiment. In this illustrative example, aircraft 300 may be an example of one implementation for assembly 202 in FIG. 2 or a platform that includes an assembly such as assembly 202 in FIG. 2.

As depicted, aircraft 300 may include wing 302 and wing 304 attached to body 306. Aircraft 300 may include engine 308 attached to wing 302 and engine 310 attached to wing 304. Body 306 may have tail section 312. Horizontal stabilizer 314, horizontal stabilizer 316, and vertical stabilizer 318 are attached to tail section 312 of body 306.

In this illustrative example, the computer system 215 described in FIG. 2 may be used to identify the locations for holes to be drilled in various parts of aircraft 300. For example, without limitation, fittings may be used to attach stringers in each wing assembly that forms wing 302 and wing 304 to body 306 of aircraft 300. Computer system 215 in FIG. 2 may be used to correct the nominal locations for holes that are to be drilled into these fittings based on the actual machined configurations of the stringers and the structure of body 306 to which the stringers are to be attached.

Figure 4:
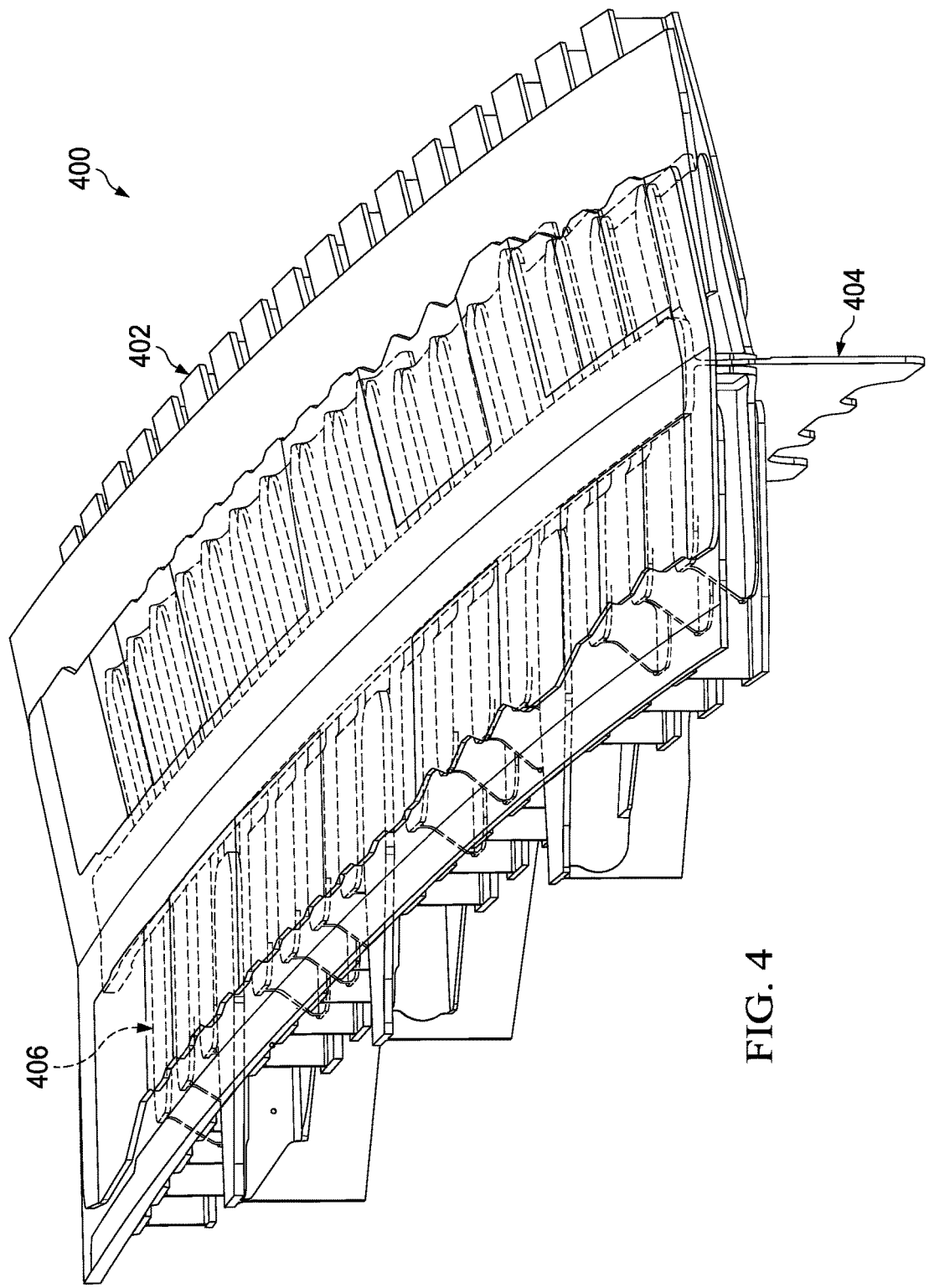
FIG. 4 is an illustration of an isometric view of an assembly within aircraft 300 from FIG. 3 in accordance with an illustrative embodiment.

With reference now to FIG. 4, an illustration of an isometric view of an assembly within aircraft 300 from FIG. 3 is depicted in accordance with an illustrative embodiment. In this illustrative example, assembly 400 is depicted from the view of lines 4-4 in FIG. 3.

Assembly 400 includes plurality of stringers 402, T-chord structure 404, and plurality of fittings 406. Each stringer in plurality of stringers 402 may be an example of one implementation of first part 204 in FIG. 2. T-chord structure 404 is associated with body 306 of aircraft 300 from FIG. 3. T-chord structure 404 may be an example of one implementation for second part 206 in FIG. 2. Further, each fitting in plurality of fittings 406 may be an example of one implementation for third part 208 in FIG. 2.

Figure 5:
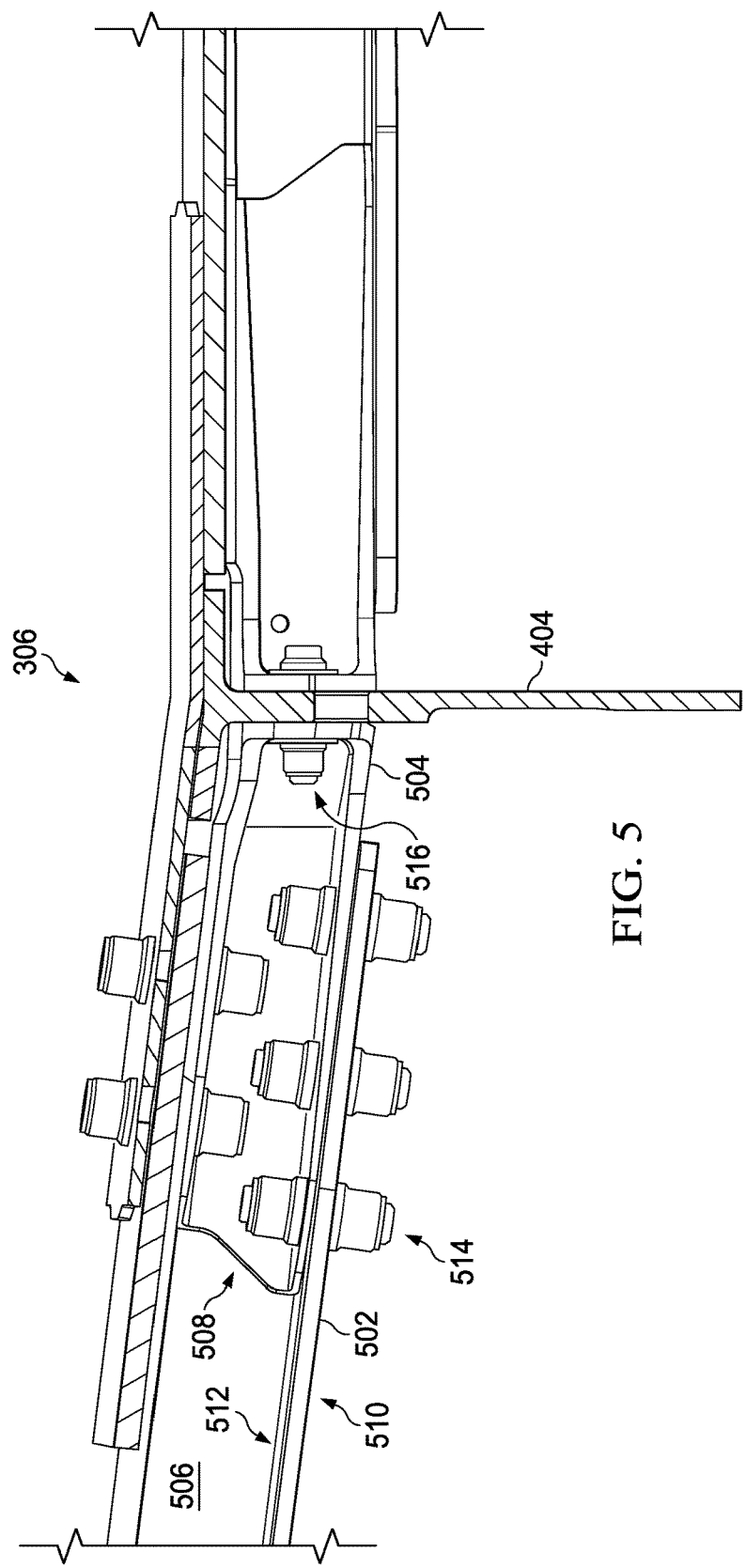
FIG. 5 is an illustration of a straight-on view of assembly 400 in FIG. 4 in accordance with an illustrative embodiment.

With reference now to FIG. 5, an illustration of a straight-on view of assembly 400 is depicted in accordance with an illustrative embodiment. In this illustrative example, stringer 502 is shown attached to T-chord structure 404 from FIG. 4 through fitting 504. Stringer 502 may be an example of one of plurality of stringers 402 shown in FIG. 4. Further, fitting 504 may be an example of one of plurality of fittings 406 shown in FIG. 4.

As depicted, stringer 502 has surface 506. Fitting 504 interfaces with first portion 508 of surface 506, second portion 510 of surface 506, and third portion 512 of surface 506. First set of fasteners 514 are used to attach fitting 504 to stringer 502. Second set of fasteners 516 are used to attach fitting 504 to T-chord structure 404.

In this illustrative example, the set of holes (not shown) that were drilled in fitting 504 for receiving second set of fasteners 516 were drilled based on a set of locations identified using a computer system, such as computer system 215 described in FIG. 2. In particular, overall offset data, similar to overall offset data 246 in FIG. 2, may have been used to determine the set of locations at which the set of holes were drilled into fitting 504.

The illustrations of aircraft 300 in FIG. 3 and assembly 400 in FIGS. 4-5 are not meant to imply physical or architectural limitations to the manner in which an illustrative embodiment may be implemented. Other components in addition to or in place of the ones illustrated may be used. Some components may be optional.

Figure 6:
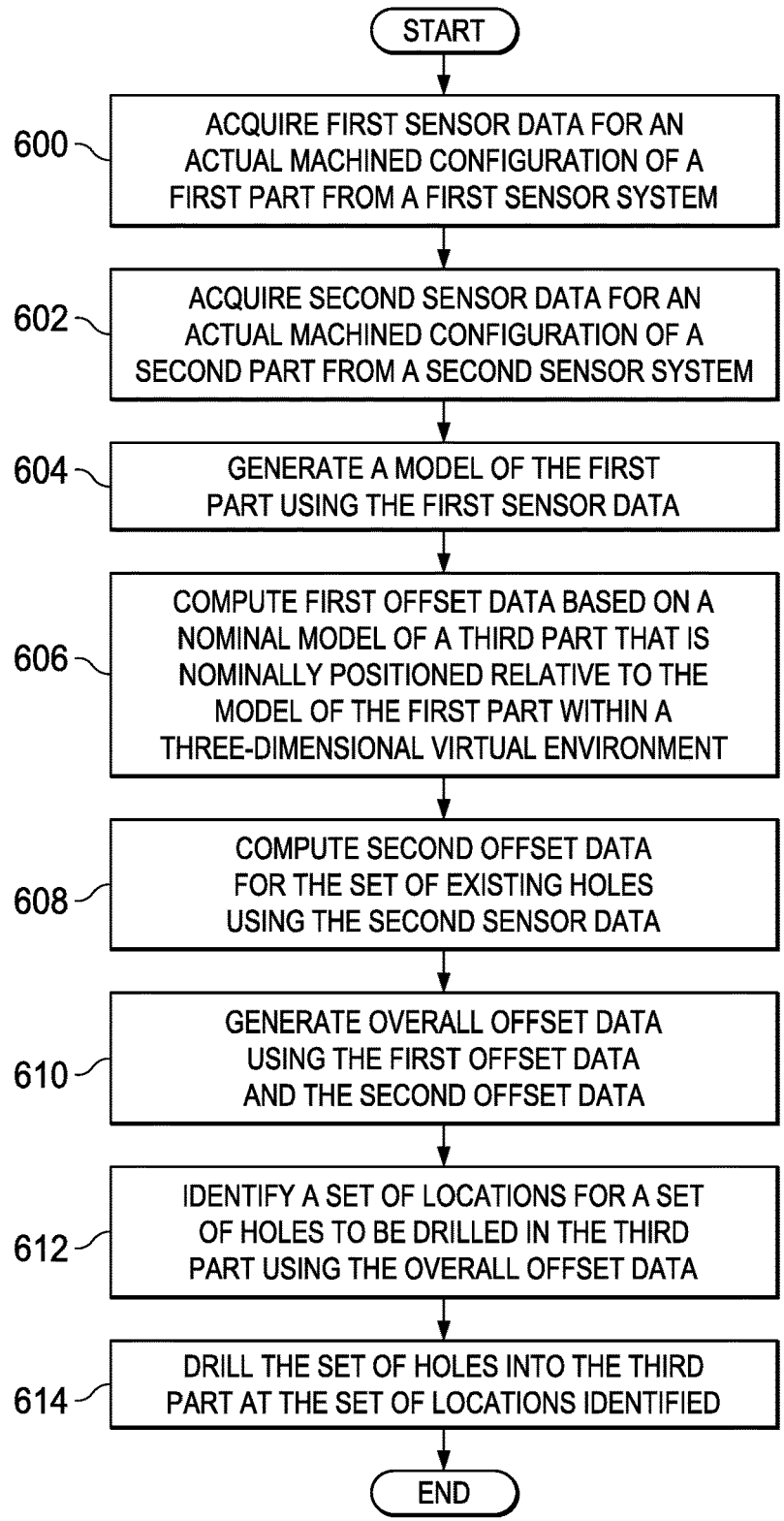
FIG. 6 is an illustration of a process for machining a part for an assembly in the form of a flowchart in accordance with an illustrative embodiment.

With reference now to FIG. 6, an illustration of a process for machining a part for an assembly is depicted in the form of a flowchart in accordance with an illustrative embodiment. The process illustrated in FIG. 6 may be implemented using computer system 215 in FIG. 2.

The process may begin by acquiring first sensor data for an actual machined configuration of a first part from a first sensor system (operation 600). Second sensor data for an actual machined configuration of a second part is acquired from a second sensor system (operation 602). A model of the first part is generated using the first sensor data (operation 604).

Thereafter, first offset data is computed based on a nominal model of a third part that is nominally positioned relative to the model of the first part within a three-dimensional virtual environment (operation 606). Second offset data is computed for the set of existing holes using the second sensor data (operation 608).

Next, overall offset data is generated using the first offset data and the second offset data (operation 610). Thereafter, the overall offset data may be used for identifying a set of locations for a set of holes to be drilled in the third part (operation 612). The set of holes is then drilled into the third part at the set of locations identified (operation 614), with the process terminating thereafter. Once the process described in FIG. 6 has been completed, the third part may then be joined with the first part and the second part using fasteners.

Figure 7:
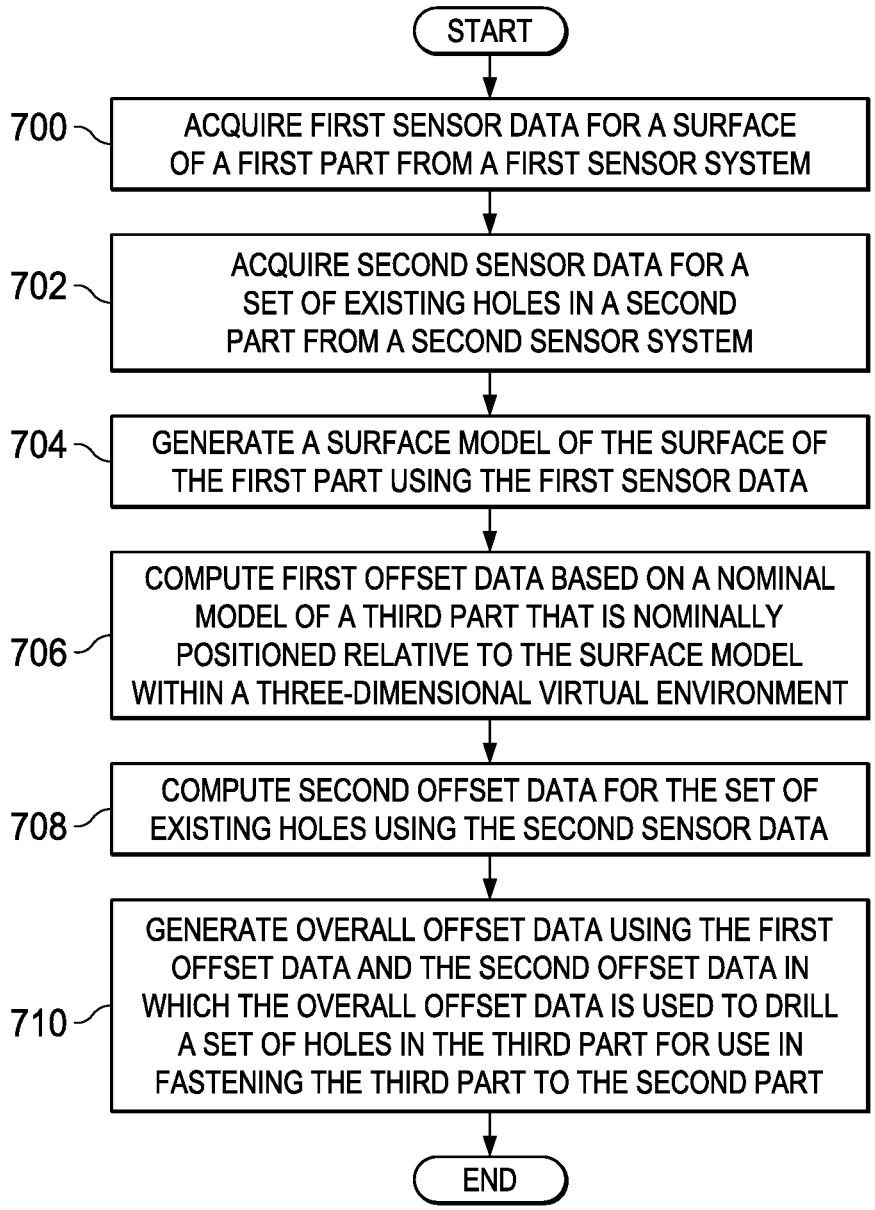
FIG. 7 is an illustration of a process for machining a part for an assembly in the form of a flowchart in accordance with an illustrative embodiment.

With reference now to FIG. 7, an illustration of a process for machining a part for an assembly is depicted in the form of a flowchart in accordance with an illustrative embodiment. The process illustrated in FIG. 7 may be implemented using computer system 215 in FIG. 2.

The process may begin by acquiring first sensor data for a surface of a first part from a first sensor system (operation 700). In one illustrative example, the first sensor data is point cloud data generated using a first laser imaging system. Second sensor data for a set of existing holes in a second part is acquired from a second sensor system (operation 702). In one illustrative example, the second sensor data identifies a set of actual locations for the set of existing holes using a second laser imaging system. Each actual location in the set of actual locations may be a center location of the hole measured using the second laser imaging system.

Thereafter, a surface model of the surface of the first part is generated using the first sensor data (operation 704). First offset data is computed based on a nominal model of a third part that is nominally positioned relative to the surface model within a three-dimensional virtual environment (operation 706). Second offset data is computed for the set of existing holes using the second sensor data (operation 708). Then, overall offset data is generated using the first offset data and the second offset data in which the overall offset data is used to drill a set of holes in the third part for use in fastening the third part to the second part (operation 710), with the process terminating thereafter.

Figure 8:
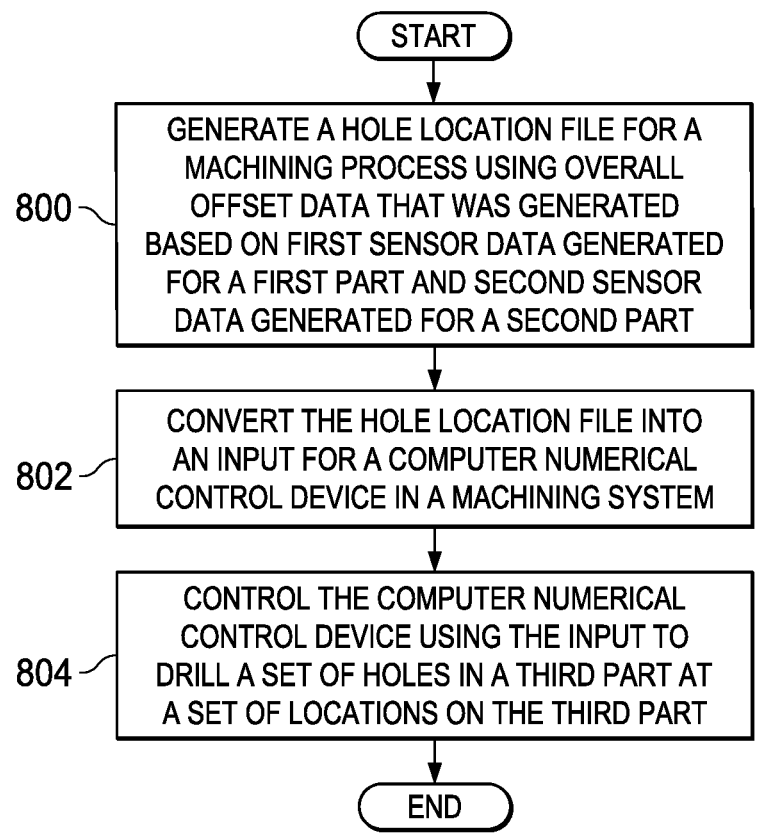
FIG. 8 is an illustration of a process for drilling holes into a part for an assembly in the form of a flowchart in accordance with an illustrative embodiment.

With reference now to FIG. 8, an illustration of a process for drilling a set of holes into a part for an assembly is depicted in the form of a flowchart in accordance with an illustrative embodiment. The process illustrated in FIG. 8 may be implemented using computer system 215 and machining system 250 in FIG. 2.

The process begins by generating a hole location file for a machining process using overall offset data that was generated based on first sensor data generated for a first part and second sensor data generated for a second part (operation 800). In operation 800, the overall offset data may be, for example, the overall offset data generated in operation 710 in FIG. 7. In one illustrative example, the hole location file is in an XML format.

Next, the hole location file is converted into an input for a computer numerical control device in a machining system (operation 802). The computer numerical control device is then controlled using the input to drill a set of holes in a third part at a set of locations on the third part (operation 804), with the process terminating thereafter. In operation 804, each location in the set of locations may be a nominal location that has been corrected or adjusted to account for variances in the surface of the first part from nominal and variances in a set of actual locations of a set of existing holes in the second part. Once the set of holes have been drilled in the third part in operation 804, the third part may be joined with the first part and the second part as part of building an assembly.

In operation 802, the hole location file, which may be a file in an XML format, may be used to generate a program for causing the computer numerical control device to controllably position a drill or machining tool at the adjusted hole locations to drill the set of holes at the set of locations on the third part. The program generated may take the form of, for example, without limitation, a file in a Drawing eXchange Format (DXF), an Initial Graphics Exchange Specification (IGES) format, a computer-aided manufacturing (CAM) format, or some other format.

Figure 9:
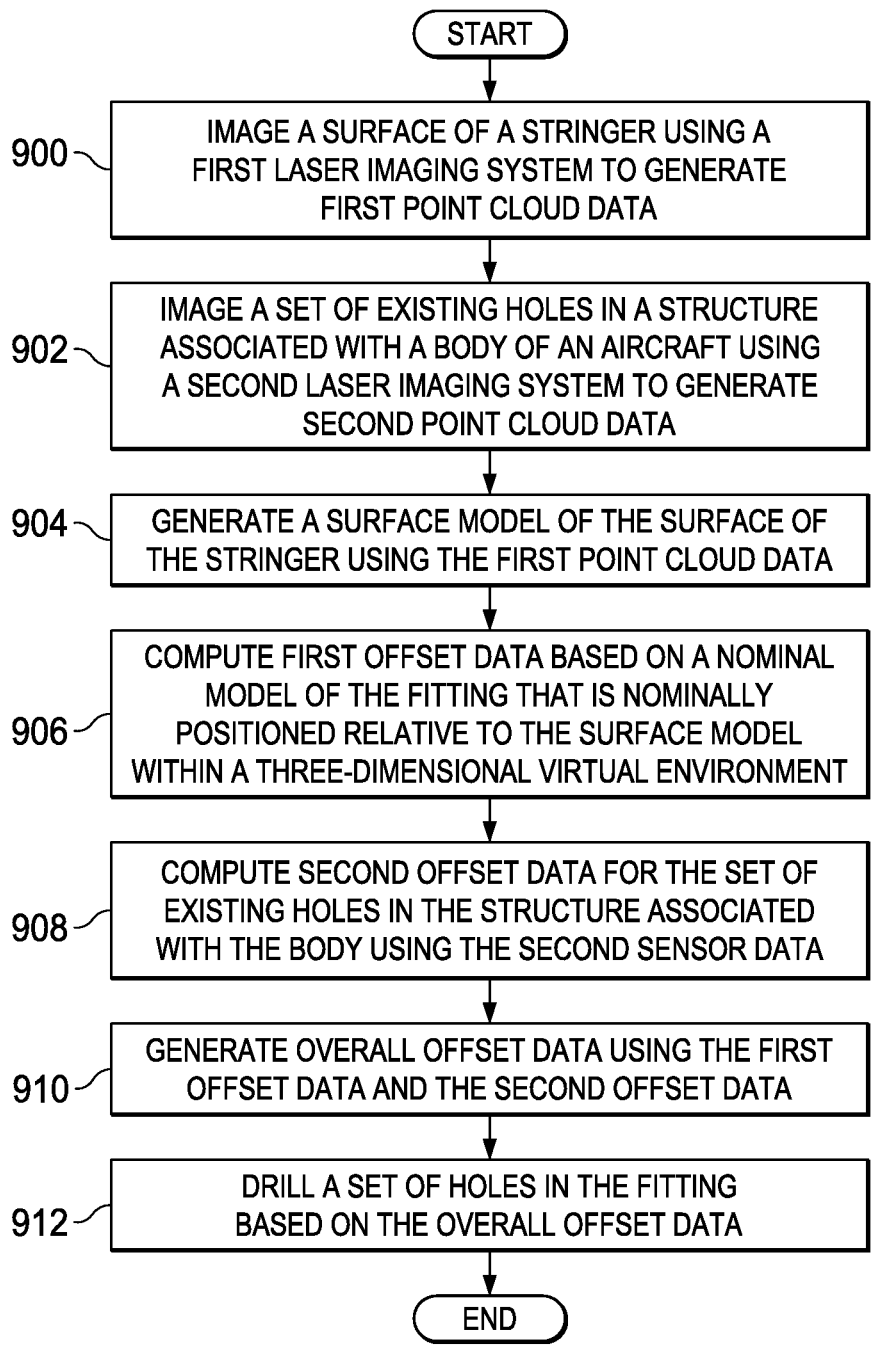
FIG. 9 is an illustration of a process for assembling a fitting, a stringer, and a structure associated with a body of an aircraft in the form of a flowchart in accordance with an illustrative embodiment.

With reference now to FIG. 9, an illustration of a process for assembling a fitting, a stringer, and a structure associated with a body of an aircraft is depicted in the form of a flowchart in accordance with an illustrative embodiment. The process illustrated in FIG. 9 may be performed within a manufacturing environment, such as manufacturing environment 200 in FIG. 2.

The process begins by imaging a surface of a stringer using a first laser imaging system to generate first point cloud data (operation 900). Next, a set of existing holes in a structure of a body of an aircraft is imaged using a second laser imaging system to generate second point cloud data (operation 902).

Thereafter, a surface model of the surface of the stringer is generated using the first point cloud data (operation 904). Next, first offset data is computed based on a nominal model of the fitting that is nominally positioned relative to the surface model within a three-dimensional virtual environment (operation 906). Then, second offset data is computed for the set of existing holes in the structure associated with the body using the second sensor data (operation 908). Overall offset data is then generated using the first offset data and the second offset data (operation 910). A set of holes is drilled in the fitting based on the overall offset data (operation 912), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 10:
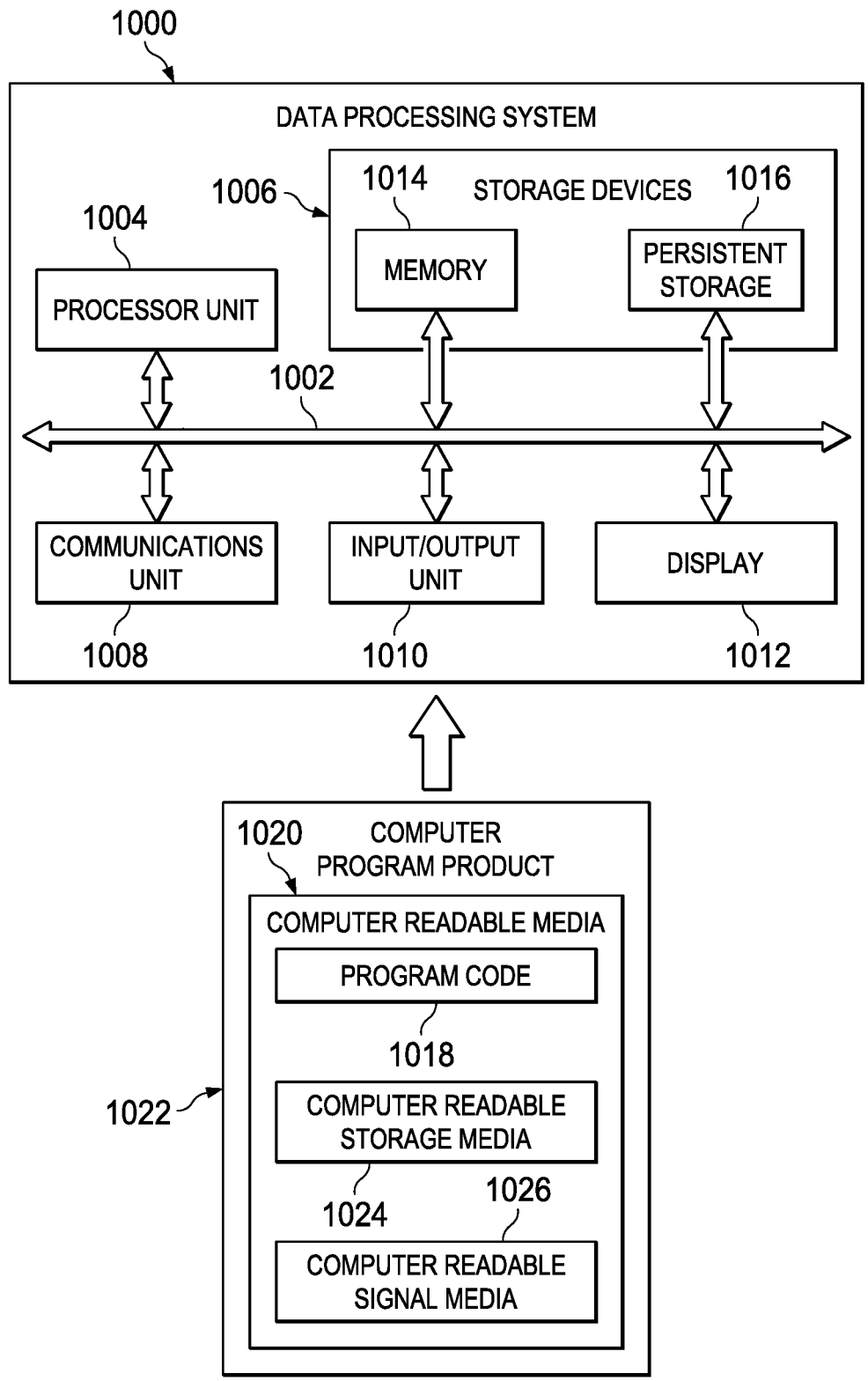
FIG. 10 is an illustration of a data processing system in the form of a block diagram in accordance with an illustrative embodiment.

Turning now to FIG. 10, an illustration of a data processing system in the form of a block diagram is depicted in accordance with an illustrative embodiment. Data processing system 1000 may be used to implement computer system 215 in FIG. 2. As depicted, data processing system 1000 includes communications framework 1002, which provides communications between processor unit 1004, storage devices 1006, communications unit 1008, input/output unit 1010, and display 1012. In some cases, communications framework 1002 may be implemented as a bus system.

Processor unit 1004 is configured to execute instructions for software to perform a number of operations. Processor unit 1004 may comprise a number of processors, a multi-processor core, and/or some other type of processor, depending on the implementation. In some cases, processor unit 1004 may take the form of a hardware unit, such as a circuit system, an application specific integrated circuit (ASIC), a programmable logic device, or some other suitable type of hardware unit.

Instructions for the operating system, applications, and/or programs run by processor unit 1004 may be located in storage devices 1006. Storage devices 1006 may be in communication with processor unit 1004 through communications framework 1002. As used herein, a storage device, also referred to as a computer readable storage device, is any piece of hardware capable of storing information on a temporary and/or permanent basis. This information may include, but is not limited to, data, program code, and/or other information.

Memory 1014 and persistent storage 1016 are examples of storage devices 1006. Memory 1014 may take the form of, for example, a random access memory or some type of volatile or non-volatile storage device. Persistent storage 1016 may comprise any number of components or devices. For example, persistent storage 1016 may comprise a hard drive, a flash memory, a rewritable optical disk, a rewritable magnetic tape, or some combination of the above. The media used by persistent storage 1016 may or may not be removable.

Communications unit 1008 allows data processing system 1000 to communicate with other data processing systems and/or devices. Communications unit 1008 may provide communications using physical and/or wireless communications links.

Input/output unit 1010 allows input to be received from and output to be sent to other devices connected to data processing system 1000. For example, input/output unit 1010 may allow user input to be received through a keyboard, a mouse, and/or some other type of input device. As another example, input/output unit 1010 may allow output to be sent to a printer connected to data processing system 1000.

Display 1012 is configured to display information to a user. Display 1012 may comprise, for example, without limitation, a monitor, a touch screen, a laser display, a holographic display, a virtual display device, and/or some other type of display device.

In this illustrative example, the processes of the different illustrative embodiments may be performed by processor unit 1004 using computer-implemented instructions. These instructions may be referred to as program code, computer usable program code, or computer readable program code and may be read and executed by one or more processors in processor unit 1004.

In these examples, program code 1018 is located in a functional form on computer readable media 1020, which is selectively removable, and may be loaded onto or transferred to data processing system 1000 for execution by processor unit 1004. Program code 1018 and computer readable media 1020 together form computer program product 1022. In this illustrative example, computer readable media 1020 may be computer readable storage media 1024 or computer readable signal media 1026.

Computer readable storage media 1024 is a physical or tangible storage device used to store program code 1018 rather than a medium that propagates or transmits program code 1018. Computer readable storage media 1024 may be, for example, without limitation, an optical or magnetic disk or a persistent storage device that is connected to data processing system 1000.

Alternatively, program code 1018 may be transferred to data processing system 1000 using computer readable signal media 1026. Computer readable signal media 1026 may be, for example, a propagated data signal containing program code 1018. This data signal may be an electromagnetic signal, an optical signal, and/or some other type of signal that can be transmitted over physical and/or wireless communications links.

The illustration of data processing system 1000 in FIG. 10 is not meant to provide architectural limitations to the manner in which the illustrative embodiments may be implemented. The different illustrative embodiments may be implemented in a data processing system that includes components in addition to or in place of those illustrated for data processing system 1000. Further, components shown in FIG. 10 may be varied from the illustrative examples shown.

Figure 11:
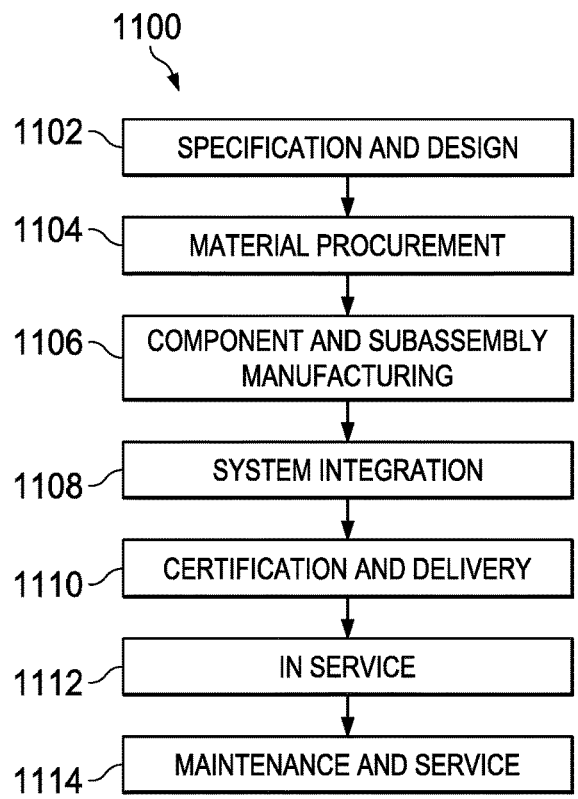
FIG. 11 is an illustration of an aircraft manufacturing and service method in the form of a block diagram in accordance with an illustrative embodiment.
Figure 12:
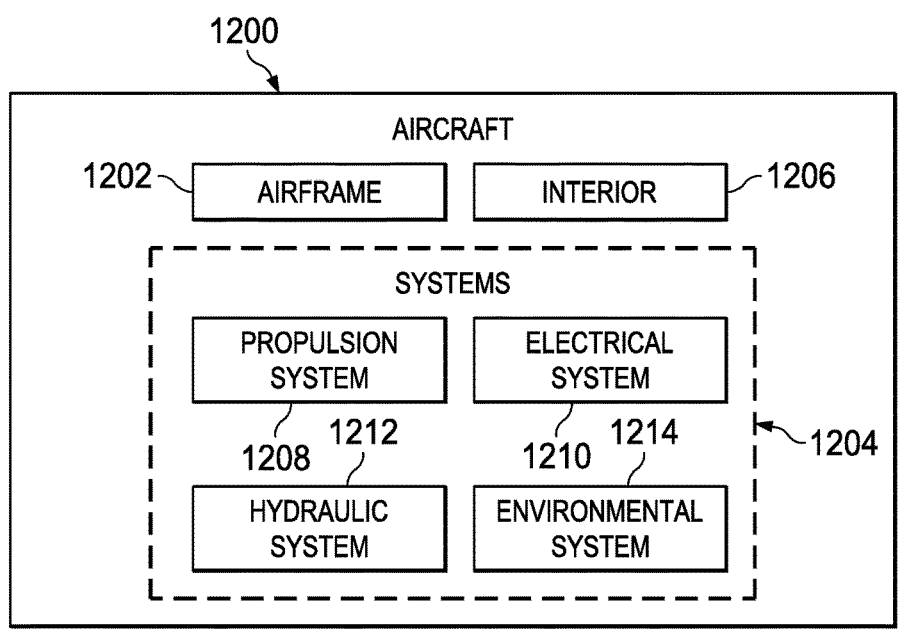
FIG. 12 is an illustration of an aircraft in the form of a block diagram in accordance with an illustrative embodiment.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for maintenance and service 1114, which may include modification, reconfiguration, refurbishment, routine maintenance and service, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 in FIG. 11 and may include airframe 1202 with systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11. In particular, assembly 202 from FIG. 2 may be built during any one of the stages of aircraft manufacturing and service method 1100. For example, without limitation, set of locations 216 for set of holes 214 to be drilled into third part 208 in FIG. 2 may be identified using first sensor system 222, second sensor system 224, and computer system 215 in FIG. 2 during at least one of component and subassembly manufacturing 1106, system integration 1108, maintenance and service 1114, or some other stage of aircraft manufacturing and service method 1100. Still further, set of holes 214 may then be drilled into third part 208 at set of locations 216 during any one of or combination of the stages in aircraft manufacturing and service method 1100.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. As yet another example, one or more apparatus embodiments, method embodiments, or a combination thereof, may be utilized during production stages, such as component and subassembly manufacturing 1106 and system integration 1108 in FIG. 11. One or more apparatus embodiments, method embodiments, or a combination thereof, may be utilized while aircraft 1200 is in service 1112 and/or during maintenance and service 1114 in FIG. 11. The use of a number of the different illustrative embodiments may substantially expedite the assembly of and/or reduce the cost of aircraft 1200.

The illustrative embodiments provide a method and apparatus for predetermining locations on a particular part that is to be joined with two or more other parts based on imaging data collected for the actual machined configurations of those other parts. In one illustrative example, a virtual indexing of two parts is performed using metrology data, such as laser imaging data. The virtual position of a selected part that is to be joined with the two other parts is then used to generate full-size hole attributes. These attributes are translated into the local machine axis for use in drilling full-size holes that maintain a hole vector. For example, the full-size hole attributes may include a position and/or vector for a center of a full-size hole that is to be drilled.

With an aircraft, this type of process for predetermining hole attributes, or locations, may allow the drilling of full-size holes in fittings to be performed before the process of joining the wing to the body of an aircraft. The fitting may be joined to the stringer of the wing and the T-chord structure of the body of the fuselage after the wing has been joined to the fuselage, relying on the wing-to-body position for accuracy. Pre-determined holes and full size drilling may reduce or eliminate the need for in-tank drilling of holes after the joining of the wing to the body of the aircraft. In this manner, the flow of the process for joining a wing to a body of an aircraft may be improved.

By reducing or eliminating the need for in-tank drilling, safety and ergonomics may be improved for production personnel. Further, the discard rate for fittings due to human error during the process of joining the wing to the body may be reduced. The process provided by the illustrative embodiments improves the quality of part-to-part indexing and fastening by maintaining vector and sub-component angles and eliminating internal loads due to human error of indexing.

The illustrative embodiments provide a method and apparatus for translating the imaging data collected for the machined configurations of a first part and a second part to a drill template for a machining system that may include a 5-axis milling machine. The drill template identifies locations for the holes that are to be drilled in a third part in which these locations have been adjusted from nominal based on the imaging data of the machined configurations for the first part and the second part.

In one illustrative example, data from a laser tracker is collected for a surface of a first part, which may be, but is not limited to, a stringer for the wing of an aircraft. The laser tracker is used to collect data for mid-body, or center, hole positions for existing holes in a second part, which may be, but is not limited to, a T-chord structure in the body of the aircraft. The data collected is fed into a process implemented using a special-purpose computer system that outputs a hole location file.

The process may reduce or eliminate data outliers to thereby, refine the data. Offset data is generated for nominal hole locations for the holes that are to be drilled into a fitting that is to be joined with the stringer and the T-chord structure is identified. The offset data may be computed based on finding the most protruding points on the surface of the stringer and computing offsets that clear any interference and exceed gap condition between the stringer and the fitting. Further, the offsets may take into account any variances in the existing holes in the T-chord structure. The offset data generated is used to build an XML file that may be processed by the machining system. A process for validating the XML file and generating a machine drill template or program for drilling based on fixture position is performed. A probe fitting may be loaded onto the machining system to find index features on the fitting. The drill template may be used to adjust the probe fitting position to drill full-size holes in the fitting. The holes drilled using this type of process may have a greater level of accuracy than a process that relies on a human estimating the locations for these holes.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for machining a part for an assembly, the method comprising:
acquiring first sensor data for a surface of a first part from a first sensor system;
acquiring second sensor data for a set of existing holes in a second part from a second sensor system;
generating a surface model of the surface of the first part using the first sensor data;
computing first offset data based on a nominal model of a third part that is nominally positioned relative to the surface model within a three-dimensional virtual environment;
computing second offset data for the set of existing holes using the second sensor data; and generating overall offset data using the first offset data and the second offset data, wherein the overall offset data is used to drill a set of holes in the third part for use in fastening the third part to the second part.

2. The computer-implemented method of claim 1, wherein computing the first offset data comprises:
identifying an actual location of a most protruding point on each portion of the surface model of the first part that interfaces with the nominal model of the third part; and
computing a distance between the actual location and a nominal location of the most protruding point on the each portion of the surface model of the first part that interfaces with the nominal model of the third part.

3. The computer-implemented method of claim 2, wherein computing the first offset data further comprises:
applying a selected factor to each distance computed based on a geometry of the nominal model of the third part to generate a first x-axis offset and a first y-axis offset for each hole of the set of holes that is to be drilled in the third part.

4. The computer-implemented method of claim 1, wherein computing the second offset data comprises:
computing the second offset data for the set of existing holes by measuring a difference between a nominal location and an actual location for each existing hole of the set of existing holes.

5. The computer-implemented method of claim 1 further comprising:
generating a hole location file for a machining process using the overall offset data.

6. The computer-implemented method of claim 5 further comprising:
generating an input for a computer numerical control device using the hole location file; and
controlling the computer numerical control device to drill the set of holes in the third part using the input.

7. The computer-implemented method of claim 5, wherein generating the hole location file comprises:
generating the hole location file in an XML format.

8. The computer-implemented method of claim 1, wherein acquiring the first sensor data comprises:
receiving the first sensor data for the surface of the first part from a laser imaging system at a processor in communication with the laser imaging system.

9. The computer-implemented method of claim 1, wherein acquiring the second sensor data comprises:
receiving the second sensor data for the set of existing holes in the second part from a laser imaging system at a processor in communication with the laser imaging system.

10. A method for assembling a fitting, a stringer, and a structure associated with a body of an aircraft, the method comprising:
imaging a surface of the stringer using a first laser imaging system to generate first point cloud data;
imaging a set of existing holes in the structure using a second laser imaging system to generate second point cloud data;
generating a surface model of the surface of the stringer using the first point cloud data;
computing first offset data based on a nominal model of the fitting that is nominally positioned relative to the surface model within a three-dimensional virtual environment;
computing second offset data for the set of existing holes in the structure associated with the body;
generating overall offset data using the first offset data and the second offset data; and
drilling a set of holes in the fitting based on the overall offset data.

11. The method of claim 10 further comprising:
joining the fitting, the stringer, and the structure.

12. An apparatus for machining a structure for an assembly, the apparatus comprising:
a part modeler implemented in a computer system that is in communication with a first sensor system and a second sensor system,
wherein the part modeler acquires first sensor data for a surface of a first part from the first sensor system and second sensor data for a set of existing holes in a second part from the second sensor system; and
wherein the part modeler generates a surface model of the surface of the first part using the first sensor data; and
an offset data generator implemented in the computer system, wherein the offset data generator computes first offset data based on a nominal model of a third part that is nominally positioned relative to the surface model of the surface of the first part within a three-dimensional virtual environment, computes second offset data for the set of existing holes in the second part, and generates overall offset data using the first offset data and the second offset data, wherein the overall offset data is used to drill a set of holes in the third part for use in fastening the third part to the second part.

13. The apparatus of claim 12, wherein the first offset data includes:
a first x-axis offset and a first y-axis offset for each hole of the set of holes to be drilled in the third part.

14. The apparatus of claim 13, wherein a position for the third part with respect to a z-axis is considered fixed.

15. The apparatus of claim 13, wherein the second offset data includes:
a second x-axis offset and a second y-axis offset for the each hole of the set of holes to be drilled in the third part.

16. The apparatus of claim 12, wherein the offset data generator generates a hole location file for a machining process using the overall offset data.

17. The apparatus of claim 16, wherein the hole location file is in an XML format.

18. The apparatus of claim 16 further comprising:
a computer numerical control device that receives an input created based on the hole location file and drills the set of holes in the third part using the input.

19. The apparatus of claim 12 further comprising:
the first sensor system; and
the second sensor system.

20. The apparatus of claim 19, wherein each of the first sensor system and the second sensor system is a laser imaging system.

* * * * *